United States Patent
Chen et al.

(10) Patent No.: US 7,237,475 B2
(45) Date of Patent: Jul. 3, 2007

(54) CABINET DESIGN OF FILTER HOLDER FOR PRESSURIZED ESPRESSO MACHINES

(75) Inventors: Andrew Yuen Chin Chen, Tai Po (HK); Sum Fat Poon, Tai Po (HK)

(73) Assignee: Electrical and Electronics, Limited, Tai Po, N.T. (HK)

( * ) Notice: Subject to any disclaimer, the term of this patent is extended or adjusted under 35 U.S.C. 154(b) by 189 days.

(21) Appl. No.: 10/745,440

(22) Filed: Dec. 23, 2003

(65) Prior Publication Data

US 2005/0132891 A1 Jun. 23, 2005

(51) Int. Cl.
*A47J 31/40* (2006.01)
*A47J 31/00* (2006.01)
(52) U.S. Cl. ............... 99/302 R; 99/295; 99/289 R
(58) Field of Classification Search .......... 99/302 R, 99/295, 289 R
See application file for complete search history.

(56) References Cited

U.S. PATENT DOCUMENTS

| | | | |
|---|---|---|---|
| 1,750,068 A | | 3/1930 | Torriani |
| 5,103,716 A | * | 4/1992 | Mikkelsen ............. 99/289 R |
| 5,111,740 A | * | 5/1992 | Klein ..................... 99/295 |
| 5,388,502 A | * | 2/1995 | Hufnagl ................. 99/295 |
| 5,622,099 A | | 4/1997 | Frei |
| 5,649,472 A | | 7/1997 | Fond et al. |
| 5,794,519 A | | 8/1998 | Fischer |
| 5,913,962 A | | 6/1999 | Gasser et al. |
| 5,992,298 A | * | 11/1999 | Illy et al. ................ 99/281 |
| 6,161,469 A | * | 12/2000 | Rolla ..................... 99/293 |

(Continued)

FOREIGN PATENT DOCUMENTS

DE 19647039 A 7/1997

(Continued)

OTHER PUBLICATIONS

D.E. Patent No. 19647039 for J.J. Darboven GMBH & Co, Jul. 31, 1997. "Coffee Machine". (German).

(Continued)

*Primary Examiner*—Reginald L. Alexander
(74) *Attorney, Agent, or Firm*—Law Offices of Albert Wai-Kit Chan, PLLC

(57) ABSTRACT

This invention provides a brewing head unit of a coffee machine for inserting and locking the filter and the filter holder into the brewing head of a coffee machine. The filter and the filter holder can be inserted into the coffee machine visually. This invention further provides a simpler and easier method for inserting filter holder into a pressurized coffee machine. This invention also provides a cabinet filter holder which can be inserted or placed into the brewing head assembly/unit of a coffee machine by sliding the filter holder into the brewing head unit from front or side; by swinging the filter holder into the brewing head assembly/unit on a pivot; or by inserting the filter holder from the top. This invention further provides a brewing head assembly/unit wherein the locking mechanism is motor-driven. In one aspect of this invention, the method for opening and closing the brewing head assembly/unit of the coffee machine can be operated by remote control. This invention further provides a cabinet filter design wherein the boiler or heating system is separated from the brewing head assembly/unit.

6 Claims, 10 Drawing Sheets

U.S. PATENT DOCUMENTS

| | | | |
|---|---|---|---|
| 6,345,570 B1* | 2/2002 | Santi | 99/289 R |
| 6,481,338 B1* | 11/2002 | Wai | 99/302 R |
| 6,490,966 B2 | 12/2002 | Mariller et al. | |
| 6,510,783 B1 | 1/2003 | Basile et al. | |
| 6,748,850 B1* | 6/2004 | Kraan | 99/289 R |
| 6,935,222 B2* | 8/2005 | Chen et al. | 99/302 R |
| 2002/0121198 A1 | 9/2002 | Koolep et al. | |

FOREIGN PATENT DOCUMENTS

| | | |
|---|---|---|
| DE | 10247573 | 4/2004 |
| EP | 0555775 A | 8/1993 |
| EP | 0838185 A | 4/1998 |
| EP | 1016364 A2 | 12/1999 |
| GB | 811 979 A | 4/1959 |
| WO | WO 02/091889 | 11/2002 |
| WO | WO 03/055366 | 7/2003 |

OTHER PUBLICATIONS

D.E. Patent No. 19647039 for J.J. Darboven GMBH & Co, Jul. 31, 1997. "Coffee Machine". (English).

* cited by examiner

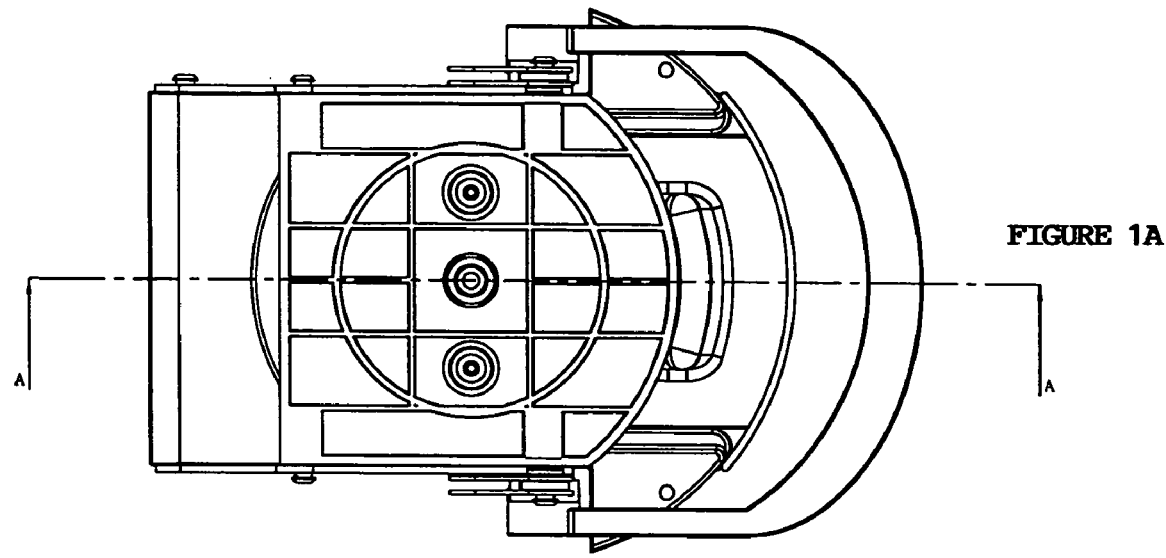
FIGURE 1A
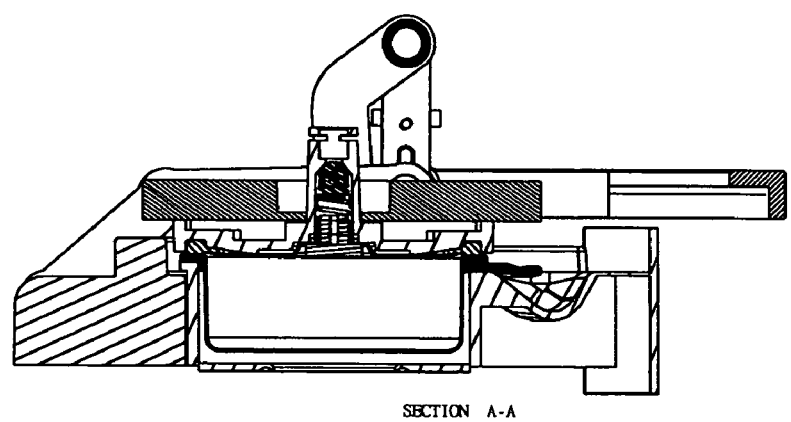
FIGURE 1B
SECTION A-A
CLOSE STAGE
FIGURE 1

SECTION A-A

OPEN STAGE

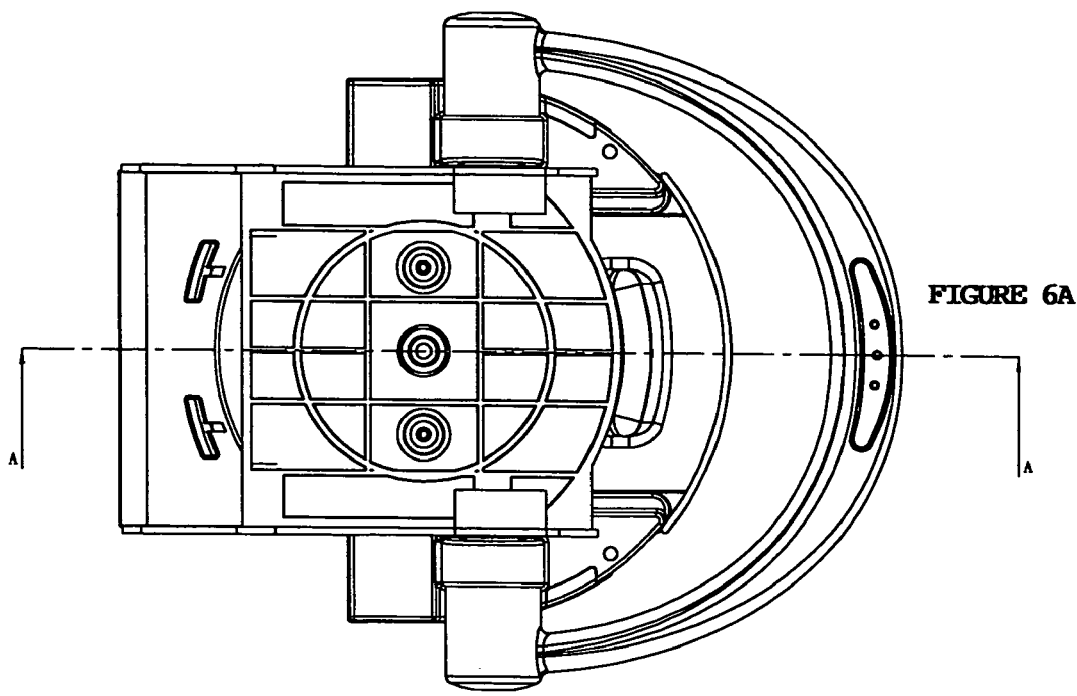
FIGURE 6A
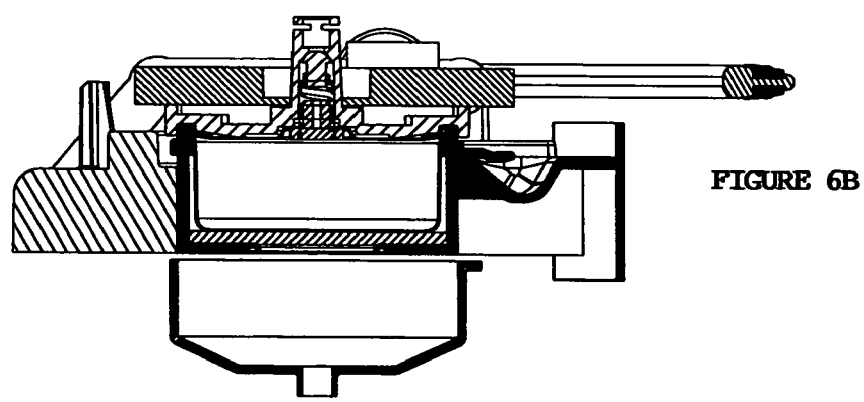
FIGURE 6B
SECTION A-A
CLOSE STAGE
FIGURE 6

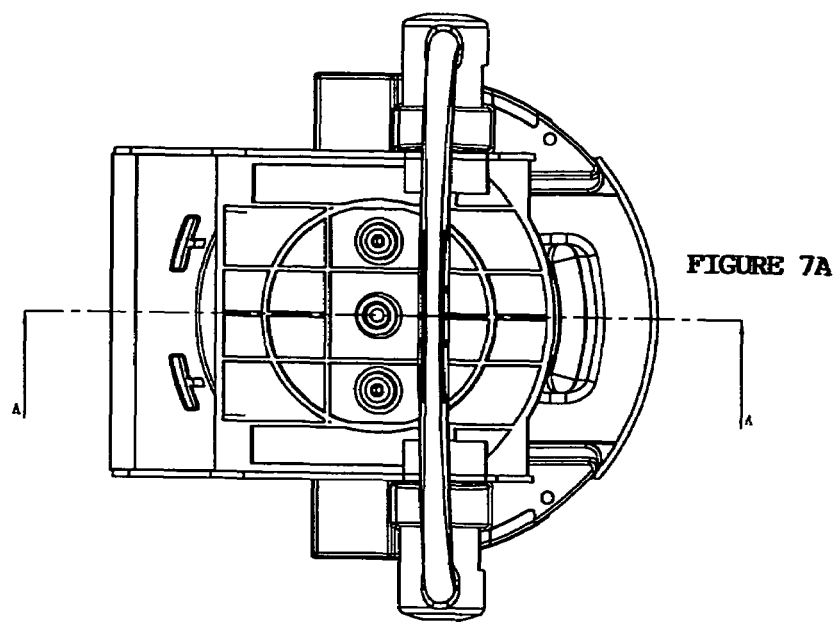
FIGURE 7A
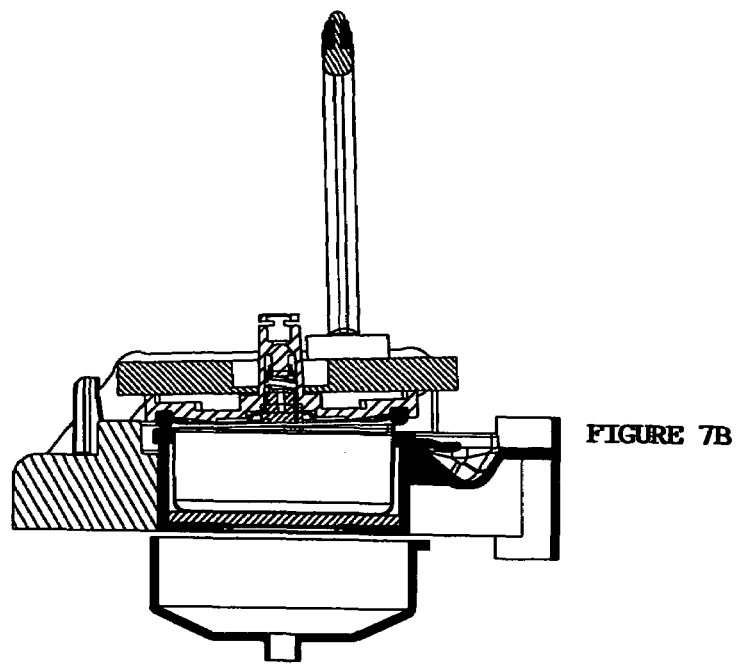
FIGURE 7B
SECTION A-A
OPEN STAGE
FIGURE 7

CABINET DESIGN OF FILTER HOLDER FOR PRESSURIZED ESPRESSO MACHINES

FIELD OF THE INVENTION

The present invention relates to the design of a brewing head unit of a coffee machine comprising locking means for detachable attachment of a cabinet- or drawer-like filter holder to the brewing head unit of the coffee machine.

BACKGROUND OF THE INVENTION

Throughout this application, various references are referred to. Disclosures of these publications in their entireties are hereby incorporated by reference into this application to more fully describe the state of the art to which this invention pertains.

The locking mechanisms employed or used by most existing pump espresso or steam espresso machines are not very user friendly. It is very cumbersome for the user to locate and attach the filter holder unit into the locking mechanism on the brewing head unit of a coffee machine. As a rule, the filter holder units which have so far been in common use for espresso machines have a brewing tray which is provided with a radially projecting handle and has inserted there into a pot-shaped filter insert. See U.S. Pat. No. 5,913,962. With such design, the user would need to put the coffee ground into the stainless steel filter then place or insert the filter into the filter holder. Next, the user would need to find the fitting slot on the brewing head unit, attach the filter unit to the brewing head unit, and turn the filter unit to lock the filter unit onto the brewing head unit. Frequently, the user spends a lot of time attempting to locate the locking position on the brewing head unit.

U.S. Pat. No. 6,490,966 relates to a device for extracting the contents in a capsule consisting of two independent and identical clamping elements, enclosing a housing for a coffee capsule. The present invention relates to a simpler mechanism for locking the filter holder comprising a lower brewing head section fixedly attached to the brewing head unit and a housing which can be adapted to receive various types filter holders and/or capsules.

Moreover, traditional pump espresso and steam espresso machine uses either a boiler or a thermal block heating system which is mounted on top of the brewing head or shower and locking mechanism. With this design, the hot water from the heating system would flow directly to the filter.

The drawback to the previous designs of mounting the boiler or the thermal block heating system on the brewing head unit is that the placement of the locking mechanism is limited by this design. The limitations/drawbacks of the placing the heating system on top of the brewing head unit include:
1. The weight of the heating system on the top will increase the force required to open the brewing head, which is not user friendly.
2. When the heating system is fixed on top of the brewing head unit, it creates a constraint on the design of the locking mechanism. In the present invention, the filter holder (movable part) is placed on the bottom. Also, in the present invention, the movable part is on the top and the fixed part is located on the bottom, so the user can slide in or swing in the filter holder unit into the brewing head unit visually.

The present invention relates to the design of a brewing head unit of a coffee machine which has a cabinet filter holder and a boiler or heating system which is not placed on the top of the brew head unit. Another aspect of the invention, the boiler or the heating system as described above is separated from the brewing head unit. In a further aspect of the invention, the boiler or the heating system can be placed side by side with the brewing head locking mechanism.

The boiler and brew head of the invention are operatively connected by a Teflon hose. The primary advantages of having a boiler or heating system which is separate from the brewing heat unit is that the brew head unit does not have to carry the weight of the boiler so that the design of the locking mechanism is more flexible, versatile and/or dynamic.

It is another object of the present invention to take away from the user all the hassles of inserting the filter holder into the brewing head unit. The present invention relates to a new design which uses easy to fit cabinet design to act as the filter holder. The user has a very simple task to perform, namely to fit the filter into the filter holder visually. There is no longer any need for the user to search blindly for the locking position. This cabinet design concept can be applied to all types of pressurized espresso machines. There are at least 5 ways to place the cabinets into the machines and they can be performed as follows:
1. Slide the cabinet filter holder into the brewing head unit from the front;
2. Slide the cabinet filter holder into the brewing head unit from the sides;
3. Slide the cabinet filter holder into the brewing head unit from the rear;
4. Swing the cabinet filter holder in or out about a pivot fixed to the brewing head unit; or
5. Insert the cabinet filter holder into the brewing head unit from the top.

In another aspect of the invention, a motor is used to operate the locking mechanism and the cabinet filter holder without any manual intervention so that the entire movement of the cabinet filter holder unit would require less effort and be more convenient for the user. In a further aspect of the invention, the movement of the cabinet is provided by a motor which is operated by a remote control.

Table 1 below summarizes the key differences between the filter holder mechanism according to the existing state of the art and claimed cabinet filter holder of the present invention.

TABLE 1

DIFFERENCES BETWEEN THE FILTER HOLDER MECHANISM ACCORDING TO THE EXISTING STATE OF THE ART AND CLAIMED CABINET FILTER HOLDER

|  | Existing pressurized filter holder mechanism | Cabinet filter holder mechanism |
| --- | --- | --- |
| Boiler or thermal block | It needs to be on top of the brew head and above the filter holder | The boiler or thermal block does not have to be on the top of the brew head. It can even be placed side by side with the locking mechanism. |
| Filter holder fitting | The user would first need to search it blindly and then would need to lock the holder in place by turning it from left to right or | The new cabinet can be slide in from the front, side or rear, or swing out or inserted from the top. The movement of |

TABLE 1-continued

DIFFERENCES BETWEEN THE FILTER HOLDER MECHANISM
ACCORDING TO THE EXISTING STATE OF THE ART
AND CLAIMED CABINET FILTER HOLDER

|  | Existing pressurized filter holder mechanism | Cabinet filter holder mechanism |
| --- | --- | --- |
|  | right to left. | the cabinet can be automated by a motor to drive/control the movement. The said motor can be operated by remote control. |
| Way to place of the filter holder in place | Search blindly | Direct/immediately visible |
| Locking method | Lock by swing fit of the filter holder. | Rotate to Lock system |

The foregoing objects and advantages of the present invention are illustrative of those that can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omission may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

According to an aspect of the invention, the design and uses of a cabinet filter holder for the brewing head assembly/unit of a coffee machine is disclosed.

According to another aspect of the invention, the boiler or heating system is separated from the brewing head assembly/unit.

According to another aspect of the invention, the filter holder assembly/unit can be inserted into the brewing head assembly/unit by sliding the filter holder unit/assembly from the front or side, swing the filter holder assembly/unit in or out of the brewing head unit on a pivot, and inserting the filter holder assembly/unit vertically from the top.

According to another aspect of the invention, the design of the locking mechanisms for locking the cabinet filter holder assembly/unit in the brewing head assembly/unit is disclosed.

According to another aspect of the invention, the design of the locking mechanism capable of locking the filter holder assembly/unit in the brewing head assembly and capable of sustaining, advantageously at least 5 bars of pressure is disclosed.

According to another aspect of the invention, the design of the locking mechanism capable of locking the filter holder assembly/unit in the brewing head assembly and capable of sustaining, advantageously at least 10 bars of pressure is disclosed.

According to another aspect of the invention, the design of the locking mechanism capable of locking the filter holder assembly/unit in the brewing head assembly and capable of sustaining, advantageously at least 15 bars of pressure is disclosed.

According to another aspect of the invention, the design of the locking mechanism capable of locking the filter holder assembly/unit in the brewing head assembly and capable of sustaining, advantageously at least 20 bars of pressure is disclosed.

According to another aspect of the invention, the locking mechanism of the invention is motor-driven and/or operated by the use of remote control.

DETAILED DESCRIPTION OF THE FIGURES

The invention relates to the sliding (in/out) filter holder and the locking mechanism capable of sustaining, advantageously at least 20 bars of pressure.

The accompanying drawing illustrates diagrammatically non-limitative embodiment of the invention as follows:

One embodiment of this invention, hereinafter referred to as Construction I, is shown in FIG. 1 to FIG. 5

FIGS. 1A and 1B are cross-sectional illustrations of the brewing head assembly/unit of Construction I in the closed position.

Another embodiment of this invention, hereinafter referred to as Construction II, is shown in FIG. 6 to FIG. 10.

FIGS. 6A and 6B are cross-sectional illustrations of the brewing head assembly/unit of Construction II in the closed position.

FIGS. 7A and 7B are cross-sectional illustrations of the brewing head assembly/unit of Construction II in the opened position.

Figure 8:
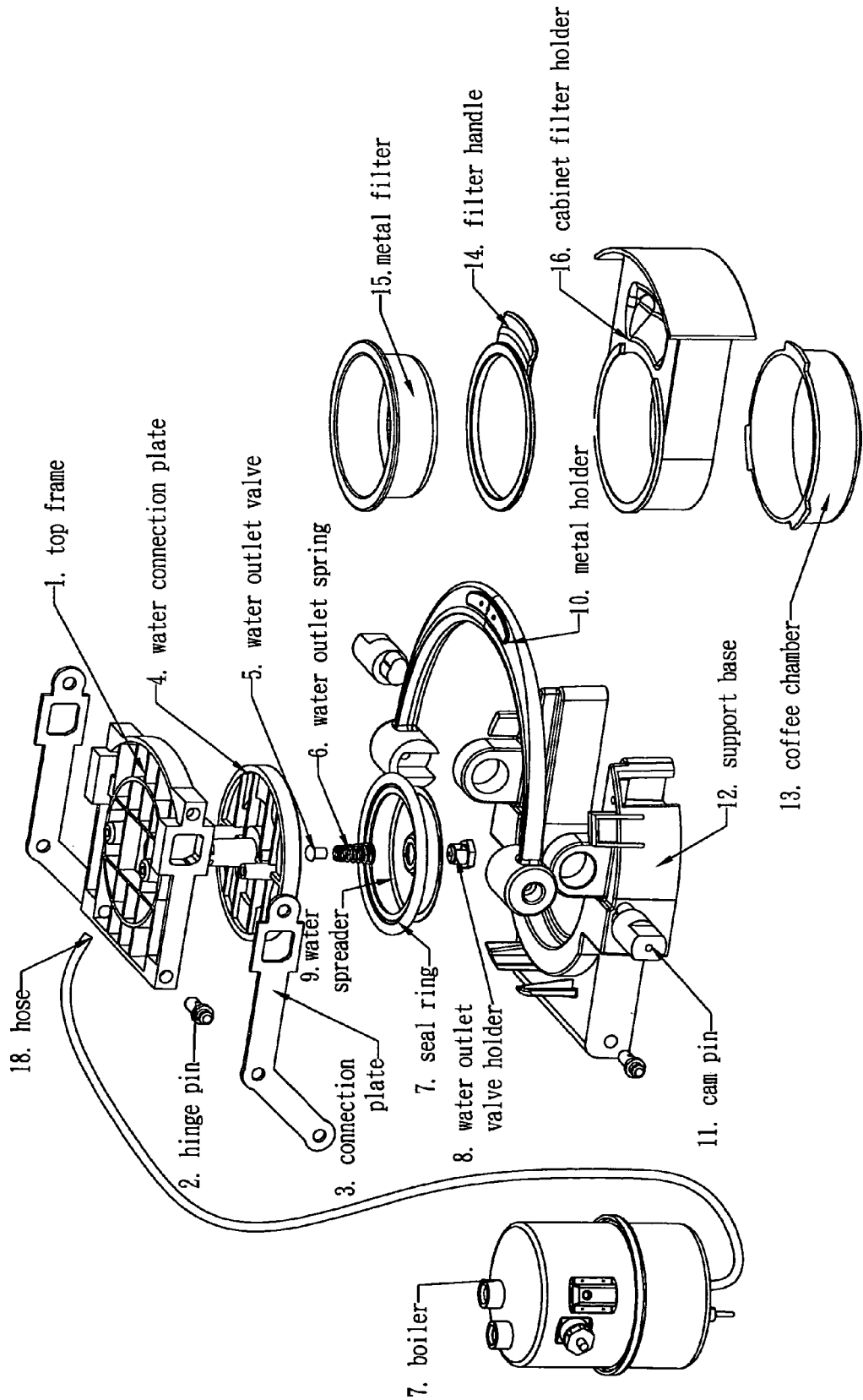

FIG. 8 is an explode view of the rotate to lock assembly, sealing assembly, slide filter holder assembly and the separated boiler and hose of Construction II.

Figure 9:
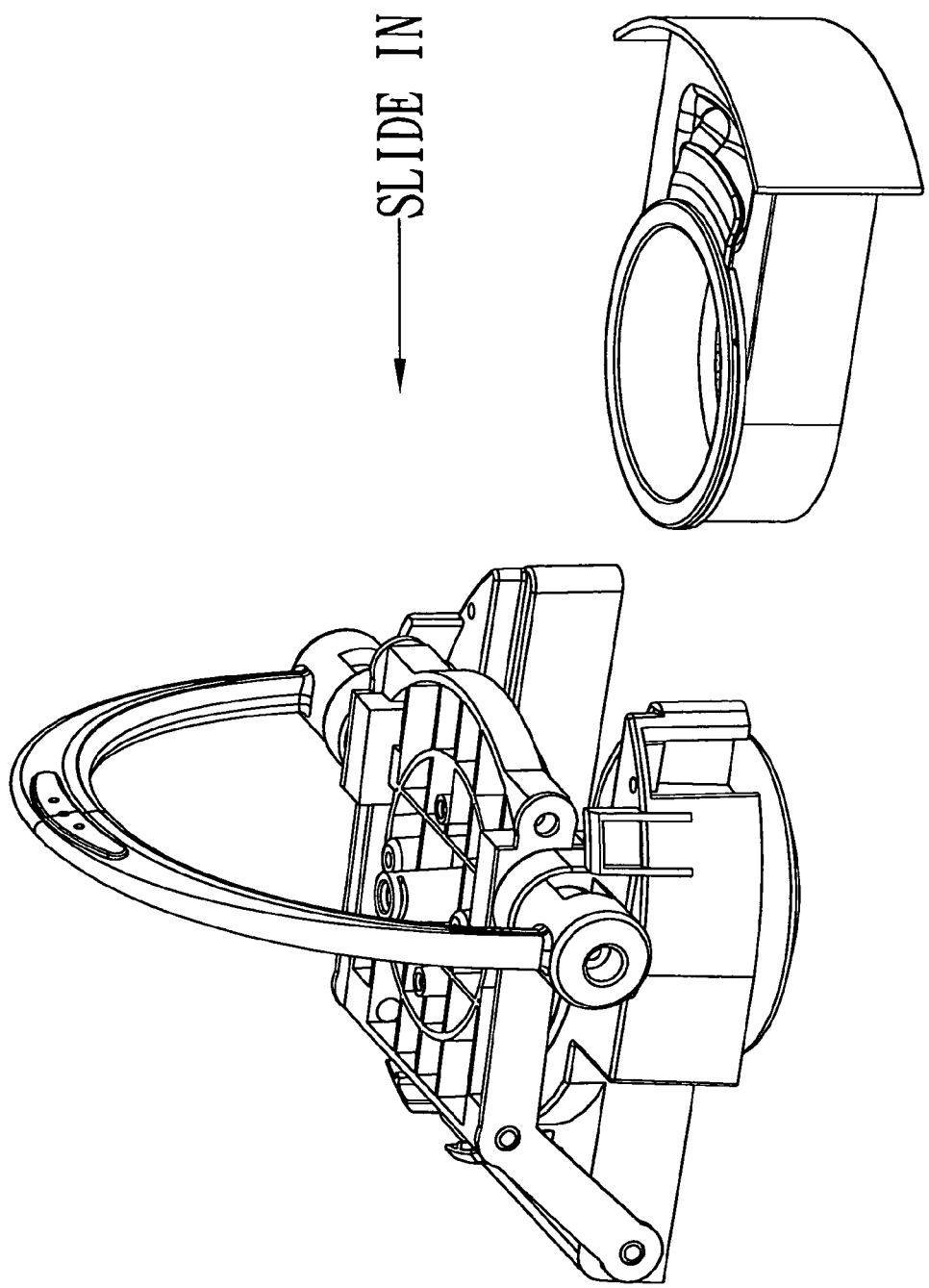

FIG. 9 is isometric view of the brewing head assembly/unit of Construction II in the opened position.

Figure 10:
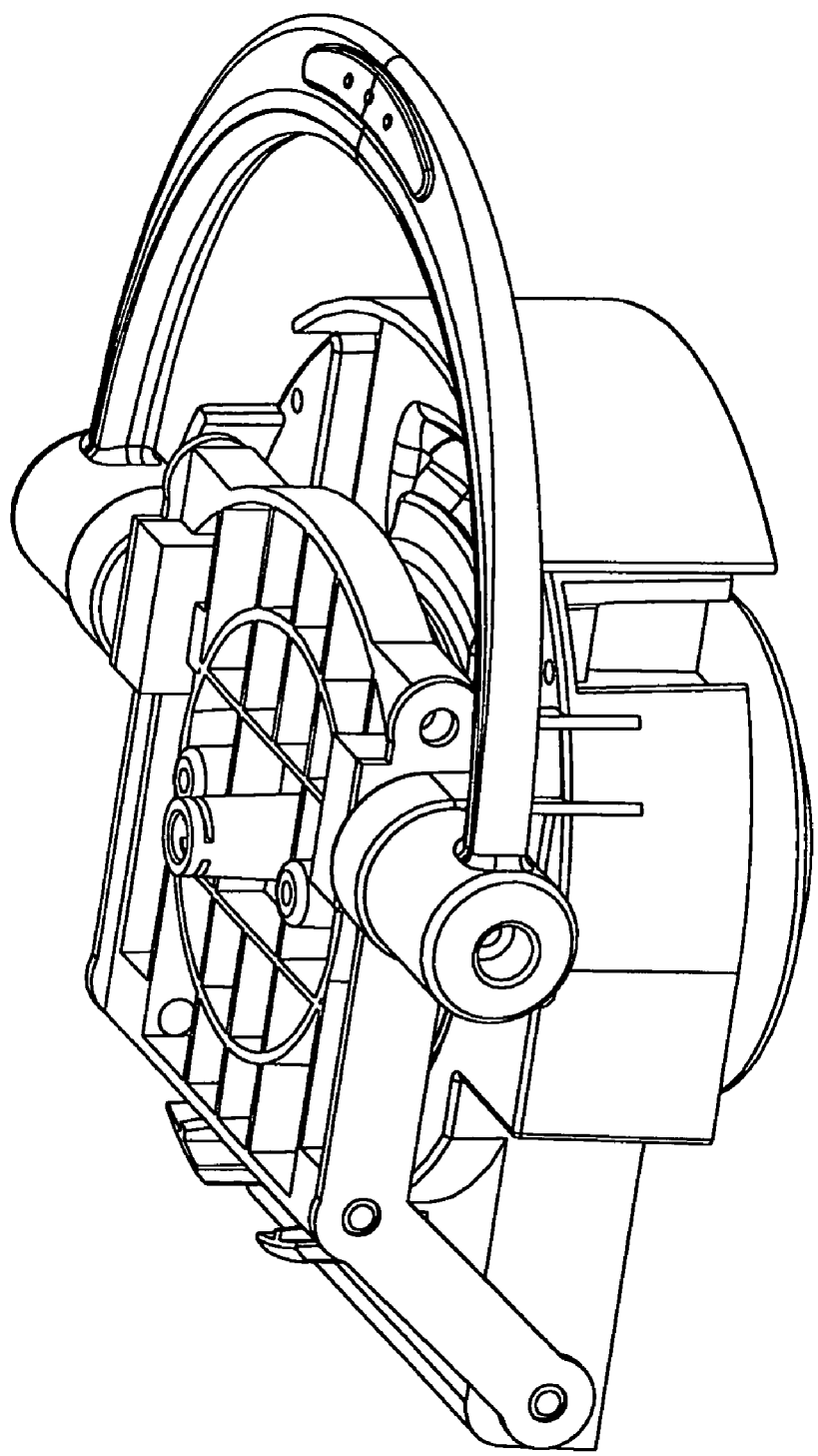

FIG. 10 is isometric view of the brewing head assembly/unit of Construction II in the closed position.

DETAILED DESCRIPTION OF THE INVENTION

It is the object of this invention to provide a cabinet design of the filter holder. This invention provides a boiler/heating system which is separate from the brewing head unit of the coffee machine and a locking mechanism.

This invention provides a locking mechanism which is advantageous over prior art in that the filter holder unit does not need to be turned for it to lock. We only need slide in the filter holder and rotate down the handle. It is easier to operate and more efficient than the traditional turning lock mechanism.

Rotate to Lock Assembly of Construction I

This invention provides a brewing head assembly/unit (See FIGS. 1-5) of a coffee maker comprising: a rotate to lock assembly, a sealing assembly and a filter holder assembly/unit, operatively linked to sustain pressure of at least 5 bars. In an embodiment, the above-described rotate to lock assembly, sealing assembly, and filter holder assembly/unit are operatively linked and are capable of sustaining advantageously at least 10 bars of pressure. In another embodiment, the above-described rotate to lock assembly, sealing assembly, and filter holder assembly/unit are operatively linked and are capable of sustaining advantageously at least 15 bars of pressure. In a further embodiment, the above-described rotate to lock assembly, sealing assembly, and filter holder assembly/unit are operatively linked and are capable of sustaining advantageously at least 20 bars of pressure.

This invention provides a rotate to lock assembly comprising handle, top frame, back connecting plate, front connecting plate, fix pin, rotate rod, rotate plate and support base. In an embodiment, the rotate to lock assembly is as set forth in FIG. 3.

This invention provides a sealing assembly comprising a Seal ring, water connection plate, water outlet valve, water outlet spring, water spreader, and water outlet valve holder. In an embodiment, the sealing assembly is set forth in FIG. 3.

This invention provides a filter holder assembly/unit comprising a filter, filter handle, filter holder and coffee chamber. In an embodiment, the filter holder assembly is set forth in FIG. 3.

The operation of the locking mechanism of an aspect of the invention of construction I, are as follows:

To prevent the leakage of water, the silicone rubber seal ring is used on the brew head. The silicone rubber seal ring is fixed between the water connection plate and water spreader by the water outlet valve holder.

To operate the lock, the handle rotates backward, the rotate rod and the rotate plate, which are operative linked, move from the upright position backwards to an inclined position. The opening angle of the brew head is about 45° to 55°. After opening the brewing head assembly/unit, the filter holder can be slide into or pulled out of the support base.

To close and/or lock the brewing head assembly/unit, the handle is moved forwards. The rotate pin, rotate plate and front connection plate move upright, and the brew head is lock. Once locked, the silicone rubber seal ring sits on the filter. The brewing head unit in the locked position will make the seal ring deform on the filter. This deformation creates a seals to prevent water from leaking from the flange of the filter.

The upright position of the rod plate, rod pin and the front connection plate can sustain at least 20 bars of pressure exerted on the filter so it will not leak when at least 20 bars of pressure is applied. At last, the coffee machine can start to brew coffee.

Figure 2:
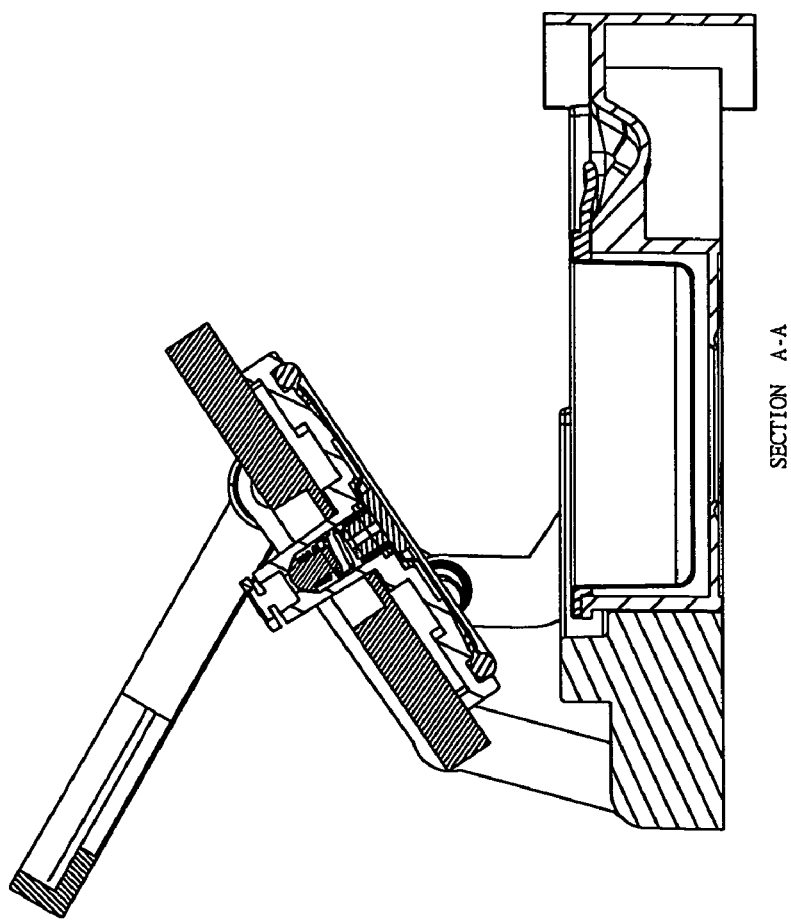
FIG. 2 is a cross-sectional illustration of the brewing head assembly/unit of Construction I in the opened position.
Figure 3:
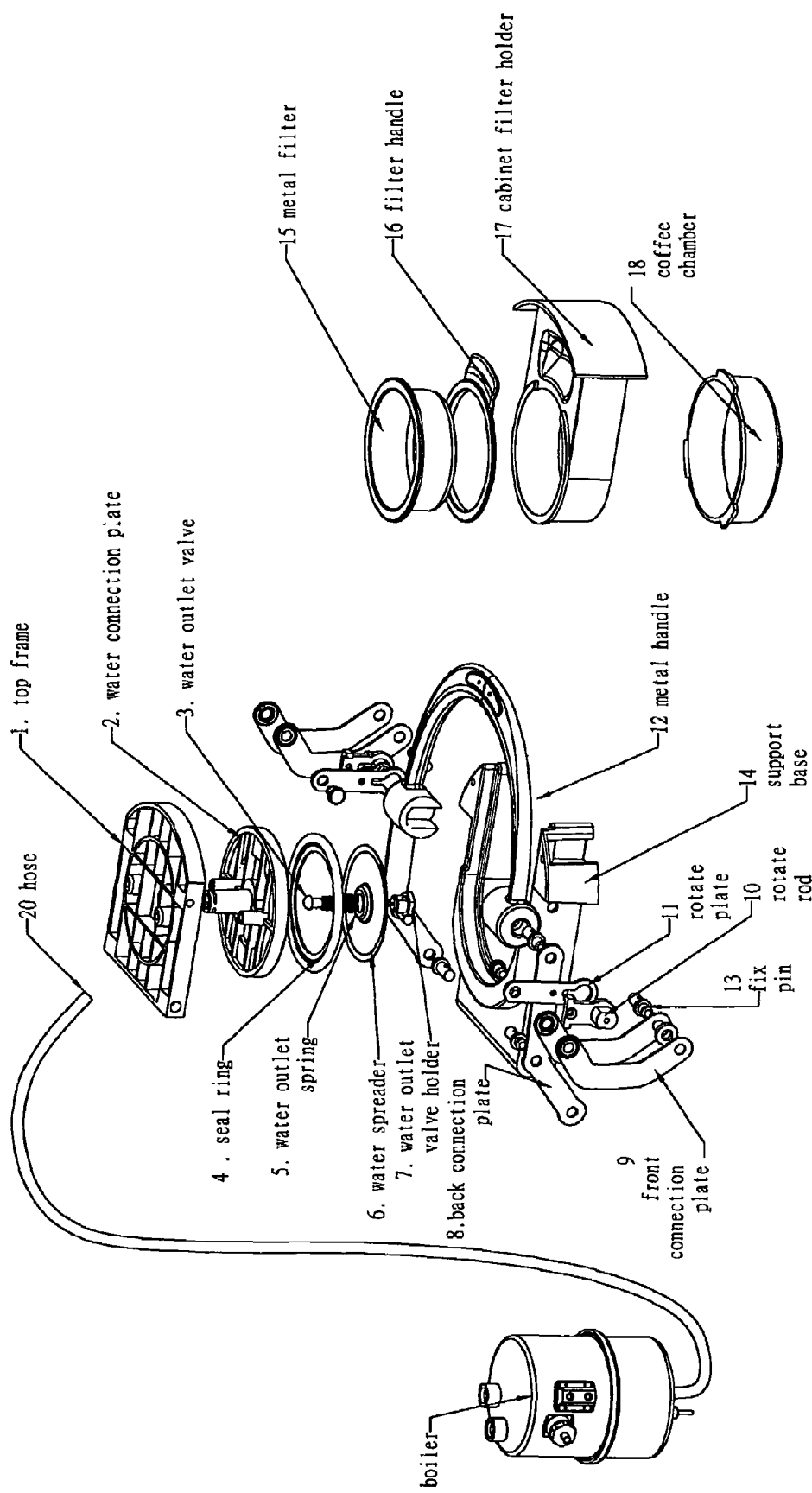
FIG. 3 is an explode view of the rotate to lock assembly, sealing assembly, slide filter holder assembly and the separated boiler and hose of Construction I.
Figure 4:
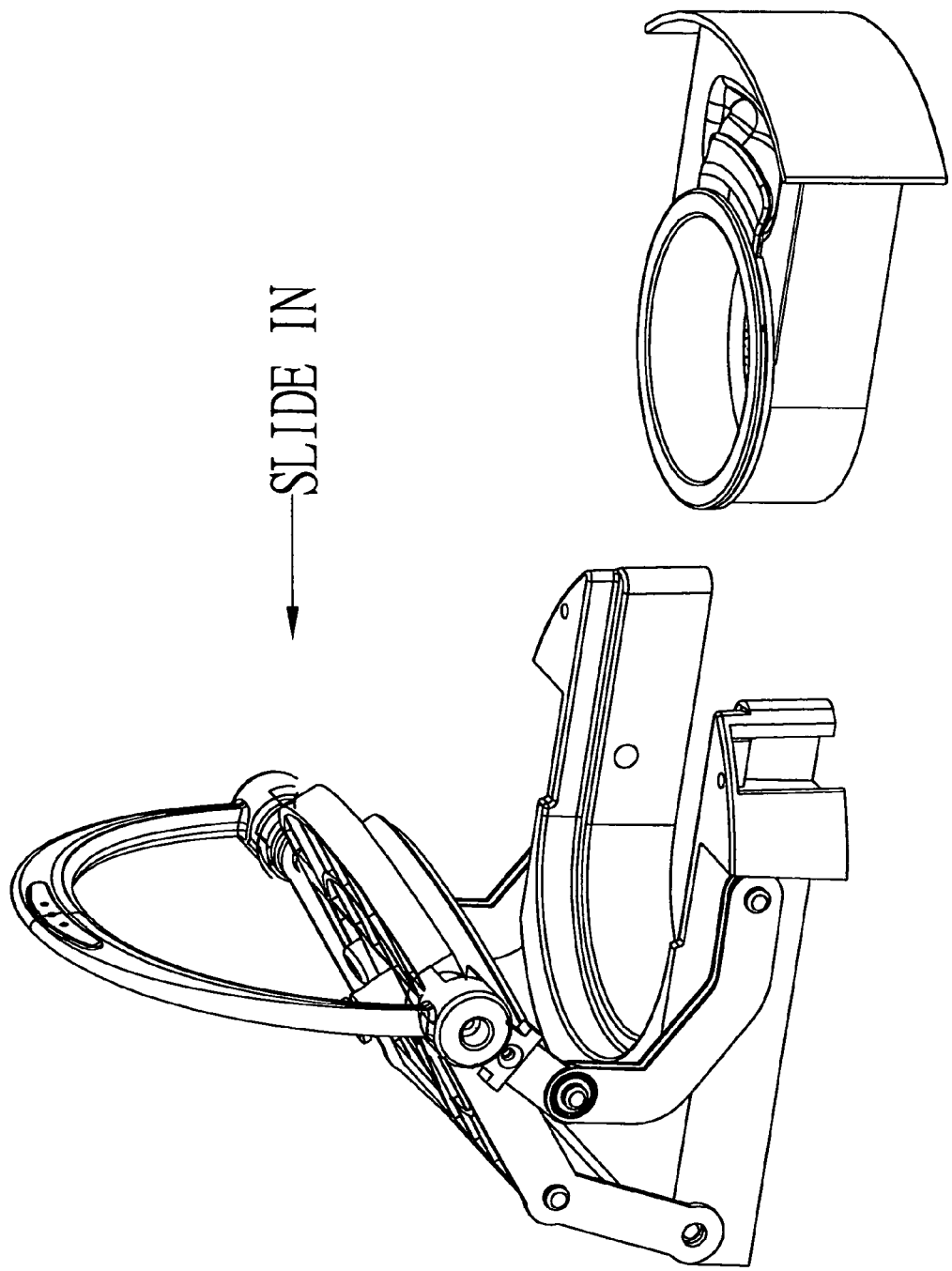
FIG. 4 is isometric view of the brewing head assembly/unit of Construction I in the opened position.
Figure 5:
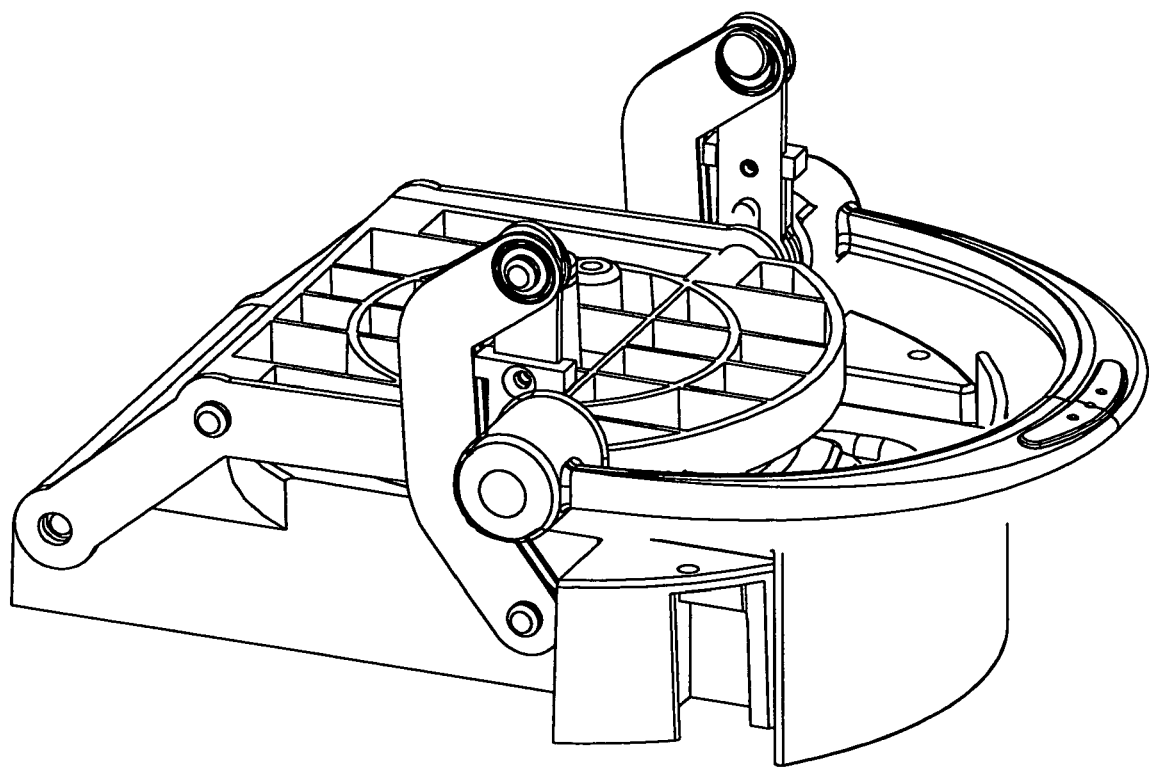
FIG. 5 is isometric view of the brewing head assembly/unit of Construction I in the closed position.

FIG. 3 shows the exploded view of one aspect of the invention to show the components of the rotate to lock assembly (construction I), sealing assembly and filter holder assembly.

As shown in FIG. 3, the metal handle 12 rotate upward for un-locking the brewing head assembly/unit. The handle is linked to the rotate plate 11, rotate rod 10, front connection plate 9 and the back connection plate 8 by a fix pin 13. All the parts move until the front connection plate is in the horizontal position. The top frame 1 will make an inclination angle of between about 45°-55° to the support base 14 when the brewing head unit is in the opened position.

The sealing assembly is composed of the top frame 1, water connection plate 2, seal ring 4, water outlet valve 3, water outlet spring 5, water spreader 6 and the water outlet valve holder 7. The water outlet valve holder 7 is the nut which holds the water spreader 7, water outlet spring 5, seal ring 4, and the water outlet valve 3 to the water connection plate 2. Then the sealing assembly is fixed to the top frame 1 by a screw. A water outlet valve 3 and water outlet spring 5 is used to prevent water or fluid from flowing out from the water spreader to the coffee under low pressure during the water heating stage. Hot water is released when the pump pressure is greater than the water outlet spring, which is around 5 Bars. When hot water makes contact with the coffee, the pump pressure will increase to at least 10 to 20 bars. Then the coffee will flow out to the cup To brew coffee, the filter holder assembly/unit needs to slide into the brewing head unit. The filter holder assembly/unit is comprised of the metal filter 15, filter handle 16, filter holder 17 and coffee chamber 18. The coffee is placed into the coffee filter, and then the filter holder is inserted into the filter holder. The coffee chamber 18 collects the coffee and then flow to the cup.

Rotate to Lock Assembly Construction II

This invention provides a brewing head assembly/unit (See FIGS. 6-10) of a coffee maker comprising: a rotate to lock assembly, a sealing assembly and filter holder assembly, operatively linked to sustain pressure of at least 5 bars. In an embodiment, the above-described rotate-to-lock assembly, sealing assembly, and filter holder assembly are operatively linked and are capable of sustaining advantageously at least 10 bars of pressure. In another embodiment, the above-described rotate-to-lock assembly, sealing assembly, and filter holder assembly are operatively linked and are capable of sustaining advantageously at least 15 bars of pressure. In a further embodiment, the above-described rotate-to-lock assembly, sealing assembly, and filter holder assembly are operatively linked and are capable of sustaining advantageously at least 20 bars of pressure.

This invention provides a rotate to lock assembly comprising handle, top frame, connecting plate, hinge pin, cam pin and support base. In an embodiment, the rotate to lock assembly is as set forth in FIG. 8.

This invention provides a sealing assembly comprising a seal ring, water connection plate, water outlet valve, water outlet spring, water spreader, and water outlet valve holder. In an embodiment, the sealing assembly is set forth in FIG. 8.

This invention provides a filter holder assembly/unit comprising a filter, filter handle, filter holder and coffee chamber. In an embodiment, the filter holder assembly/unit is set forth in FIG. 8.

The operation of the locking mechanism of another aspect of the invention, construction II, is as follows:

To prevent the leakage of water from the brewing head, the silicone rubber seal ring is used on the brewing head unit. The silicone rubber seal is fixed between the water connection plate and water spreader by the water outlet valve holder.

To operate the rotate to lock assembly, the handle is rotated upwards until the handle is 90 degrees with the horizontal (See FIG. 9). The cam pin is linked to the handle. When the cam pin rotates, it causes the connection plate to rise up. The connection plate is linked to the top frame by the hinge pin. The clamp force on the filter holder is released.

Once the brewing head assembly/unit is in the opened position, the user can insert/slide-in the filter holder assembly/unit or pull out the filter holder assembly/unit.

To brew the coffee, the filter holder assembly/unit is inserted into the cabinet filter holder housing located on the support base of the brewing head assembly/unit. Then the handle is rotated downward to the locked/closed position (see FIG. 10). The cam pin will force down the connection plate. The connection plate and cam pin will make a clamp force on the filter holder assembly. The filter holder is sealed by a seal ring and with the clamp force created by the cam pin and the connection plate.

FIG. 8 is the exploded view of the brewing head unit to show the components of the rotate to lock assembly, sealing assembly and the filter holder assembly of construction II.

As shown in FIG. 8, the metal handle 10 rotates upwards to unlock the brewing head unit. The handle is linked to cam pin 11 and the connection plate 3 by a screw. When the handle moves, the cam pin 11 will rotate. The irregular shape of the cam pin will cause the connection plate 3 to rise up because the connection plate 3 is connected to the top frame 1 by the hinge pin 2. The connection plate will also cause the top frame 1 to rise up slightly. The inclination angle between the top frame 1 and the support base 12 is about 10 degrees. This angle is just enough for the filter holder assembly/unit to slide in and out of the brewing head unit. When the filter holder assembly/unit is inserted into the brewing head unit, the handle can be rotated downward to lock the filter holder assembly/unit.

The sealing assembly is composed of the top frame 1, water connection plate 4, seal ring 7, water outlet valve 5, water outlet spring 6, water spreader 9 and the water outlet valve holder 8. The water outlet valve holder 8 is the nut which holds the water spreader 9, water outlet spring 6, seal ring 7, and water outlet valve 5 to the water connection plate 4. The sealing assembly is fixed to the top frame 1 by a screw. Water outlet valve 5 and water outlet spring 6 is used to prevent water leakage from the water spreader under low pressure during the water heating stage. Hot water is released when the pump pressure is greater than the water outlet spring, which is at least 5 Bars. When the hot water makes contact with the coffee, the pump pressure will increase to between at least 10 to 20 bars. Then the coffee will flow out to the cup.

To brew coffee, the user needs to slide the filter holder assembly/unit into the brewing head assembly/unit. The filter holder assembly/unit is comprised of the metal filter 15, filter handle 14, filter holder 16 and the coffee chamber 13. The coffee is placed on the filter, and then the filter is inserted into the filter holder. The coffee chamber 13 collects and releases the brewed coffee.

In another aspect of the invention, a motor is operatively linked to the front connection plate of construction I or cam pin of construction II. The said motor is used to rotate the linkage of the front connection plate of Construction I or the cam pin of construction II, thereby causing the metal handle to move upwards or downwards so that the locking mechanism on the brewing head assembly/unit will disengage/open or lock. A set of gears connect the cabinet filter holder unit and the motor so that the movement of the cabinet filter holder is made automatic without manual intervention. In an embodiment, a button is pressed to open the lock to allow the user to place the filter with coffee into the cabinet filter holder assembly/unit. The user then press a button to operate the motor used to slide in the cabinet and close the lock and/or the brewing head unit.

In another aspect of the invention, the motor can be operated by remote control.

Although the present invention has been described in detail with particular reference to preferred embodiments thereof, it should be understood that the invention is capable of other different embodiments, and its details are capable of modifications in various obvious aspects. As is readily apparent to those skilled in the art, variations and modifications can be affected while remaining within the spirit and scope of the invention. Accordingly, the foregoing disclosure, description, and figures are for illustrative purpose only, and do not in any way limit the invention which is defined only by the claims.

What is claimed is:

1. A brewing bead unit, comprising:
   a sliding filter holder assembly;
   a sealing assembly, comprising a water connection plate, water outlet valve, seal ring, water outlet spring, water spreader, and water outlet valve holder; and
   a rotate-to-lock assembly, comprising a top frame, back connecting plate, front connecting plate, fix pin, rotate rod, rotate plate, support base, and handle, whereby said rotate-to-lock assembly is operatively-linked to permit securement of said filter holder assembly to said sealing assembly.

2. The brewing head unit of claim 1, whereby the filter holder assembly further comprises a flange that permits linear sliding movement of said filter holder assembly relative to said brewing head unit.

3. The brewing head unit of claim 1, further comprising a heating system for producing hot fluid. whereby said heating system is detached from said brewing. head unit and is connected to said brewing head unit by a hose.

4. A brewing head unit, comprising:
   a sliding filter holder assembly;
   a sealing assembly, comprising a water connection plate, water outlet valve, seal ring, water outlet spring, water spreader, and water outlet valve holder; and
   a rotate-to-lock assembly, comprising a top frame, connection plate, cam pin, hinge pin, support base, and handle, whereby said rotate-to-lock assembly is operatively-linked to permit securement of said filter holder assembly to said sealing assembly.

5. The brewing head unit of claim 4, whereby the filter holder assembly further comprises a flange that permits linear sliding movement of said filter holder assembly relative to said brewing head unit.

6. The brewing head unit of claim 4, further comprising a heating system for producing hot fluid, whereby said heating system is detached from said brewing head unit and is connected to said brewing head unit by a hose.

* * * * *